June 1, 1937. A. A. BERAN 2,082,141
SCRAPER
Filed March 28, 1936 2 Sheets-Sheet 1
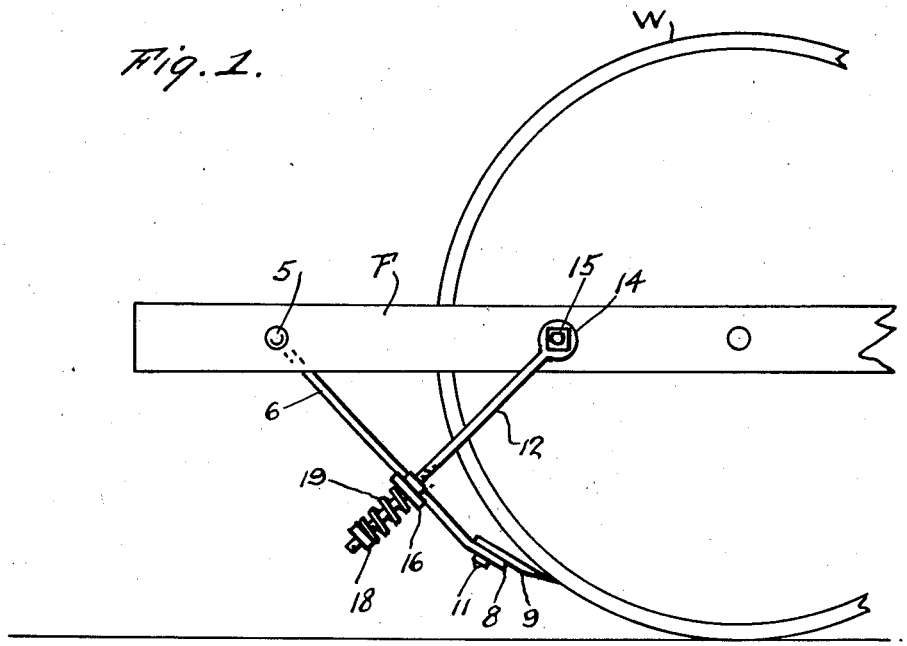
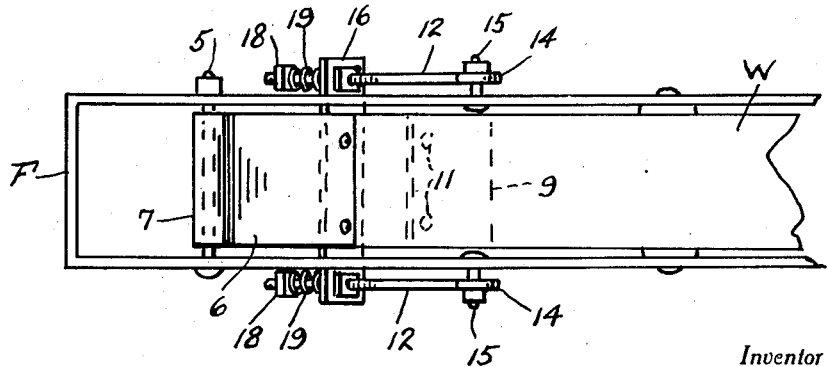
Inventor
A. A. Beran
By Clarence A. O'Brien and
Hyman Berman
Attorneys June 1, 1937.  A. A. BERAN  2,082,141
SCRAPER
Filed March 28, 1936  2 Sheets-Sheet 2
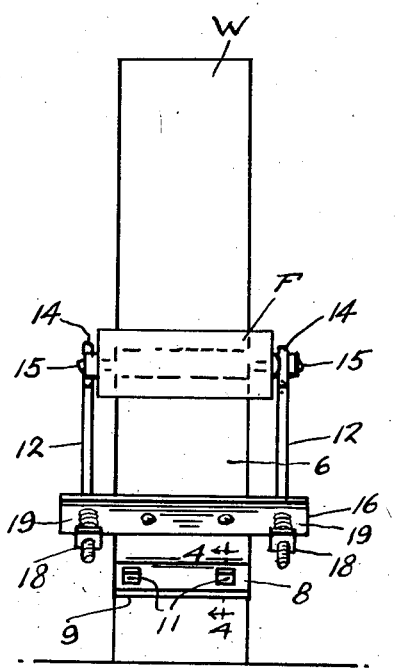
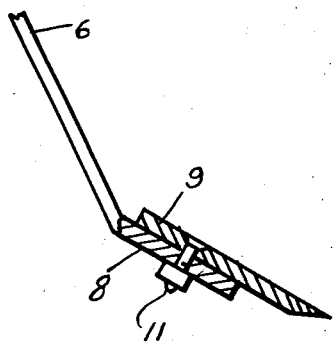
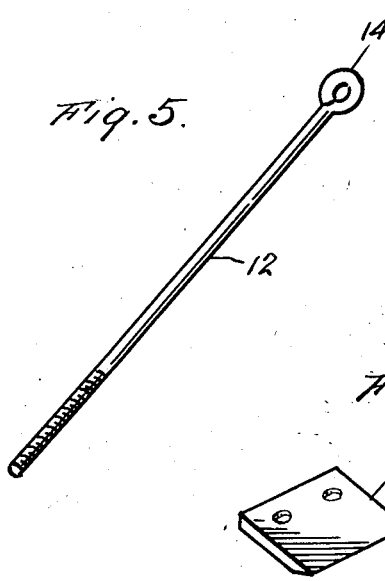
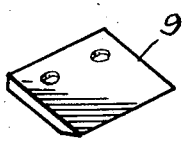
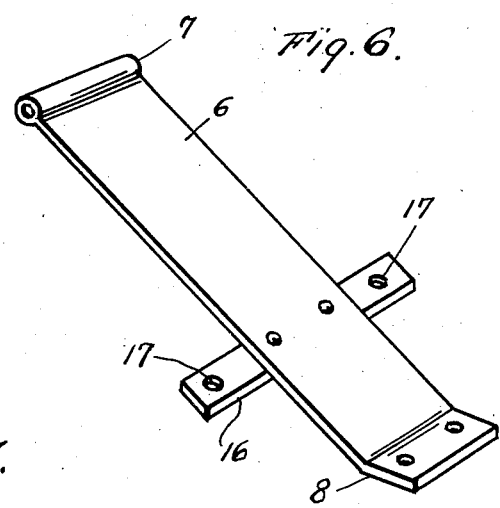
Inventor
A. A. Beran
By Clarence A. O'Brien and
Hyman Berman
Attorneys Patented June 1, 1937

2,082,141

UNITED STATES PATENT OFFICE 2,082,141

SCRAPER

Anton A. Beran, Claflin, Kans.

Application March 28, 1936, Serial No. 71,505

1 Claim. (Cl. 280—158)

The present invention appertains to devices employed for the purpose of removing soil accumulated on the tread surface of wheels more particularly in certain types of agricultural machinery, and an object of the invention is to provide a device having a movement relative to the tread surface of the wheel by which the latter is more effectively cleared of adhering soil.

Another important object of the invention resides in the provision of a scraper of this nature which is exceedingly simple in construction, inexpensive to manufacture and install, strong and durable and thoroughly reliable in use.

With the above and numerous other objects in view as will appear as the description proceeds, the invention consists in certain novel features of construction, and in the combination and arrangement of parts as will be hereinafter more fully described and claimed.

In the drawings:—

Figure 1 is a side elevation of a scraper embodying the features of my invention showing the same mounted on a frame in cooperation with the wheel, the frame and wheel being fragmentarily shown.

Figure 2 is a top plan view of what is shown in Figure 1.

Figure 3 is a rear elevation thereof.

Figure 4 is a detail section taken substantially on the line 4—4 of Figure 3.

Figure 5 is a perspective view of one of the rods.

Figure 6 is a perspective view of the plate.

Figure 7 is a perspective of the blade.

Referring to the drawings in detail it will be seen that the letter F denotes the rear portion of the frame with the wheel W mounted therein in the usual conventional manner, these two parts being illustrated only to show the practical application of my invention.

A bolt 5 extends across the rear portion of the frame F rearwardly of the wheel W. An elongated plate 6 has a sleeve 7 formed at one end which is rockable on the bolt 5. The other end extends at an obtuse angle as indicated at 8 and has a blade 9 fixed thereto. The blade is preferably detachably fixed by means of bolts 11. Rods 12 have eyes at one end as indicated at 14 and these eyes are rockable on bolts 15 mounted in the frame between the bolt 5 and the axle of the wheel W. A cross bar 16 is fixed to the plate 6 transversely thereof extending beyond the side edges thereof and the ends are provided with openings 17 through which the rods 12 extend. Nuts 18 are threaded on the bolts and coil springs 19 are mounted on the rods between the nuts 18 and the cross bar 16 impinging on the latter to urge the blade 9 into engagement with the wheel 10 and, of course, these nuts may be adjusted for changing the tension of the springs as may be desired.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

What is claimed is:—

A scraper of the class described comprising a substantially U-shaped frame disposed in straddling relation to the wheel, the side portions thereof being secured to the axle of said wheel, a bolt extending transversely through the sides of said frame, adjacent the bight portions thereof, an elongated plate swingable at one end thereof on said bolt, a blade disposed on the free end of said plate, a pair of rods rotatably secured to said frame forwardly of the pivotal point of connection of the plate, a cross bar on said plate having openings through which the free end of said rod extends, springs on said rod, disposed below said plate, nuts on the rods for securing adjustably said springs in position on said rod, said bar being disposed below the pivotal point of connection of said elongated plate.

ANTON A. BERAN.